(12) United States Patent
Steinshorn et al.

(10) Patent No.: US 10,741,311 B2
(45) Date of Patent: Aug. 11, 2020

(54) METHOD AND SYSTEM FOR A GAS-TIGHT CABLE FEEDTHROUGH

(71) Applicant: Brose Fahrzeugteile GmbH & Co. Kommanditgesellschaft, Würzburg, Würzburg (DE)

(72) Inventors: Axel Steinshorn, Wittighausen (DE); Hans-Joachim Schröder, Wiesbaden (DE)

(73) Assignee: BROSE FAHRZEUGTEILE GMBH & CO. KOMMANDITGESELLSCHAFT, WÜRZBURG, Würzburg (DE)

( * ) Notice: Subject to any disclaimer, the term of this patent is extended or adjusted under 35 U.S.C. 154(b) by 0 days.

(21) Appl. No.: 16/715,111

(22) Filed: Dec. 16, 2019

(65) Prior Publication Data

US 2020/0118717 A1    Apr. 16, 2020

Related U.S. Application Data

(63) Continuation of application No. 15/779,915, filed as application No. PCT/EP2016/078970 on Nov. 28, 2016.

(30) Foreign Application Priority Data

Dec. 1, 2015  (DE) .......................... 10 2015 223 910

(51) Int. Cl.
*H01B 17/30* (2006.01)
*H02G 1/08* (2006.01)
(Continued)

(52) U.S. Cl.
CPC .............. *H01B 17/30* (2013.01); *H02G 1/08* (2013.01); *H02G 3/22* (2013.01); *H02K 5/225* (2013.01); *H02K 15/0056* (2013.01)

(58) Field of Classification Search
CPC . H01B 17/30; H02G 1/08; H02G 3/22; H02K 5/225; H02K 15/0056
(Continued)

(56) References Cited

U.S. PATENT DOCUMENTS 3,779,078 A * 12/1973 Kaesser ................... G01K 1/14
                                                            236/95
4,972,708 A * 11/1990 Wiegleb .................. G01F 1/684
                                                            338/28
(Continued)

FOREIGN PATENT DOCUMENTS

DE        19852730 A1    6/2000
DE     102010015092 A1   1/2011
(Continued)

OTHER PUBLICATIONS

International Search Report in PCT/EP2016/078970 dated Feb. 6, 2017.
(Continued)

*Primary Examiner* — Timothy J Thompson
*Assistant Examiner* — Michael F McAllister
(74) *Attorney, Agent, or Firm* — Manelli Selter PLLC; Edward Stemberger

(57) ABSTRACT

A system includes a partition element and a first component which is arranged on a first side of the partition element. The first component includes at least one conductor, and the partition element includes an associated feedthrough for inserting and feeding through the conductor and for electrically contacting the conductor on a second side of the partition element located opposite the first side. The conductor forms a form-fitting connection to the feedthrough and is pressed into the feedthrough.

9 Claims, 3 Drawing Sheets

(51) Int. Cl.
  *H02G 3/22* (2006.01)
  *H02K 5/22* (2006.01)
  *H02K 15/00* (2006.01)

(58) Field of Classification Search
  USPC ........................................................ 174/650
  See application file for complete search history.

(56) References Cited

U.S. PATENT DOCUMENTS

| | | | | |
|---|---|---|---|---|
| 5,399,807 | A * | 3/1995 | Yarbrough | H02G 3/22 |
| | | | | 174/653 |
| 6,519,828 | B1 * | 2/2003 | Cook | G01F 1/8413 |
| | | | | 228/135 |
| 6,963,030 | B2 | 11/2005 | Matsui et al. | |
| 7,365,960 | B2 * | 4/2008 | O'Phelan | A61N 1/3754 |
| | | | | 361/508 |
| 8,674,239 | B2 * | 3/2014 | Pretzlaff | A61N 1/3754 |
| | | | | 174/152 GM |
| 2008/0190647 | A1 * | 8/2008 | Itoh | H01G 9/10 |
| | | | | 174/126.1 |
| 2011/0056745 | A1 * | 3/2011 | Crisfield | H01R 13/74 |
| | | | | 174/650 |
| 2013/0162028 | A1 | 6/2013 | Bierley | |
| 2014/0253130 | A1 | 9/2014 | Rogers et al. | |

FOREIGN PATENT DOCUMENTS

| | | |
|---|---|---|
| DE | 102011088044 A1 | 6/2013 |
| DE | 102012201499 A1 | 8/2013 |
| DE | 102013201689 A1 | 8/2014 |
| DE | 102013202614 A1 | 8/2014 |
| DE | 102013007909 A1 | 11/2014 |
| DE | 102014220771 A1 | 4/2016 |
| EP | 0532138 | 3/1993 |
| GB | 1562092 | 5/1980 |

OTHER PUBLICATIONS

Office Action in CN 201680080660.2 dated Mar. 5, 2020.
Office Action in CN 201680080660.2 dated Jul. 25, 2019.

* cited by examiner

METHOD AND SYSTEM FOR A GAS-TIGHT CABLE FEEDTHROUGH

This application is a Continuation of U.S. application Ser. No. 15/779,915, filed on May 30, 2018, which is a 371 of international application PCT/EP2016/078970, filed on Nov. 28, 2016, which claims the benefit of DE 102015223910.1, filed on Dec. 1, 2015.

FIELD OF THE INVENTION

The present invention relates to a system comprising a first component, for example a stator winding or an electronics assembly, having a conductor and a partition element. The conductor is fed through the partition element so as to electrically contact or be electrically connected to a second component on the other side. The invention furthermore relates to a method for producing the system.

TECHNICAL BACKGROUND

Known embodiments utilise methods in which a sealing medium is introduced between the contact to be fed through and the design element to be penetrated, which sealing medium is made of a polymer or a special glass depending on the temperature, pressure and required mechanical strength. When a polymer is used, the pressure tightness at high pressures and the permeability to small gas molecules are unfavourable. The direct sealing solution using glass, is, in turn, complex and difficult to implement using the production equipment of electronics manufacturing.

DE 198 52 730 C3 discloses an assembly comprising a holding part made of electrically insulating material and an electrical contact pin potted therein, which provides a gas-tight electrical connection through the holding part. The contact pin is provided at each of the two axial ends thereof with a connecting region. The connecting region forms the interface to a component to be connected to the contact pins. Between the connecting regions, the contact pin is provided with a securing region, which ensures that the contact pin is anchored in the holding part, and a potting region, against which a potting compound rests, which rests against the holding part in a receiving region in the form of a borehole.

SUMMARY OF THE INVENTION

Against this background, the object of the present invention is to provide a system having improved feedthrough of a conductor of a component through a partition element, for electrically contacting or connecting to a component on the other side of the partition element.

According to the invention, this object is achieved by a system including a partition element and a first component arranged on a first side of the partition element. The first component includes at least one conductor and the partition element includes an associated feedthrough for feeding through the conductor and for electrically contacting or connecting the conductor on a second side of the partition element located opposite the first side. The conductor forms a form-fitting connection to the feedthrough and being pressed into the feedthrough of the partition element.

The knowledge/concept on which the present invention is based is that of connecting a conductor of a component to a feedthrough of a partition element in a tight-fitting manner, the conductor being connected to the feedthrough in a form-fitting manner and forming a press fit therewith. For this purpose, the feedthrough is designed in an undersized manner or as a press fit, and the conductor is cooled until the diameter of the conductor has shrunk sufficiently to insert and feed the conductor into and through the feedthrough, so that the conductor can electrically contact or be electrically connected to a second component on the other side of the partition element.

This is advantageous in that a cost-effective and robust connection between the conductor and the partition element can be provided and, at the same time, a tight, in particular gas-tight, connection can be achieved.

Advantageous embodiments and developments can be derived from the further dependent claims and from the description with reference to the figures in the drawings.

In one embodiment according to the invention, the feedthrough is a through-hole, which forms a press fit together with the fed-through conductor, the conductor, for insertion into and feeding through the feedthrough, being previously cooled in a suitable manner so as to achieve sufficient shrinkage of the diameter thereof. In this way, the conductor can be joined to the partition element and the feedthrough thereof, and provide a tight, in particular gas-tight, connection to the partition element.

In a further embodiment according to the invention, the conductor, for example a copper conductor, is additionally aluminised on the outside thereof, or connected, for example in a form-fitting manner, to an aluminium sleeve or aluminium tube, at least in the region of the feedthrough of the partition element. The aluminium sleeve or the aluminium tube can be made of aluminium or an aluminium alloy, or the conductor is provided with a coating made of aluminium or an aluminium alloy, which may be anodised. Aluminising the conductor is advantageous in that the conductor is additionally anodised in locations where it is not to be contacted and is not anodised in locations where it is to be contacted.

According to one embodiment according to the invention, the conductor is provided with an oxide layer or anodised coating at least in the region of the feedthrough of the partition element. The oxide layer or anodised coating is applied to the outside of the conductor or, in the case of a previously aluminised conductor, to the aluminisation or coating made of aluminium or an aluminium alloy. In the case of a form-fitting connection between a conductor and an aluminium sleeve or aluminium tube, for example for a conductor made of copper, the oxide layer or anodised coating is provided on the outside of the aluminium sleeve or the aluminium tube. Such an oxide layer or anodised coating is advantageous in that it provides a good insulator, which is characterised by mechanical scratch resistance and durability.

In a further embodiment according to the invention, the conductor is made of an electrically conductive material or electrically conductive material combination, for example copper, a copper alloy, aluminium and/or an aluminium alloy. Copper and aluminium and the alloys thereof are advantageous in that they are cost-effective and exhibit good electrical conductivity.

According to another embodiment according to the invention, the partition element is made of metal, plastics material and/or fibre-reinforced plastics material. For example, the partition element can be made of steel, aluminium or an aluminium alloy, without being limited to these examples.

In one embodiment according to the invention, the at least one conductor of the first component is accommodated in a tight, in particular liquid-tight and/or gas-tight, manner, in the feedthrough of the partition element, i.e. it is accommodated in a form-fitting manner and pressed in.

In a further embodiment according to the invention, the at least one conductor can electrically contact or be electrically connected to a second component on the second side of the partition element. The first component is an electrical winding, for example a stator winding, and the second component is an electronics assembly, or vice versa.

According to another embodiment according to the invention, the temperature of the at least one conductor is adjusted to the respective operating temperature of the partition element. The diameter of the conductor expands so as to form a form-fitting connection to and a press fit with the feedthrough of the partition element at all possible operating temperatures of the partition element and preferably of the first and second components connected or coupled to the partition element. This is advantageous in that, during operation of the system, a tight-fitting, in particular liquid-tight and/or gas-tight, connection is ensured between the conductor and the partition element, which has the feedthrough, and the partition element of said system and the first component of said system, which component can electrically contact or be electrically connected to a second component.

The above embodiments and developments can be combined with one another in any way, provided this is meaningful. Additional possible embodiments, developments and implementations of the invention also encompass not explicitly described combinations of features of the invention described above or in the following with respect to the embodiments. In particular, a person skilled in the art will also add individual aspects to the respective basic form of the present invention as improvements or additions.

DESCRIPTION OF THE DRAWING

The present invention will be described in the following in greater detail on the basis of the embodiments provided in the schematic figures of the drawings, in which.

Figure 1:
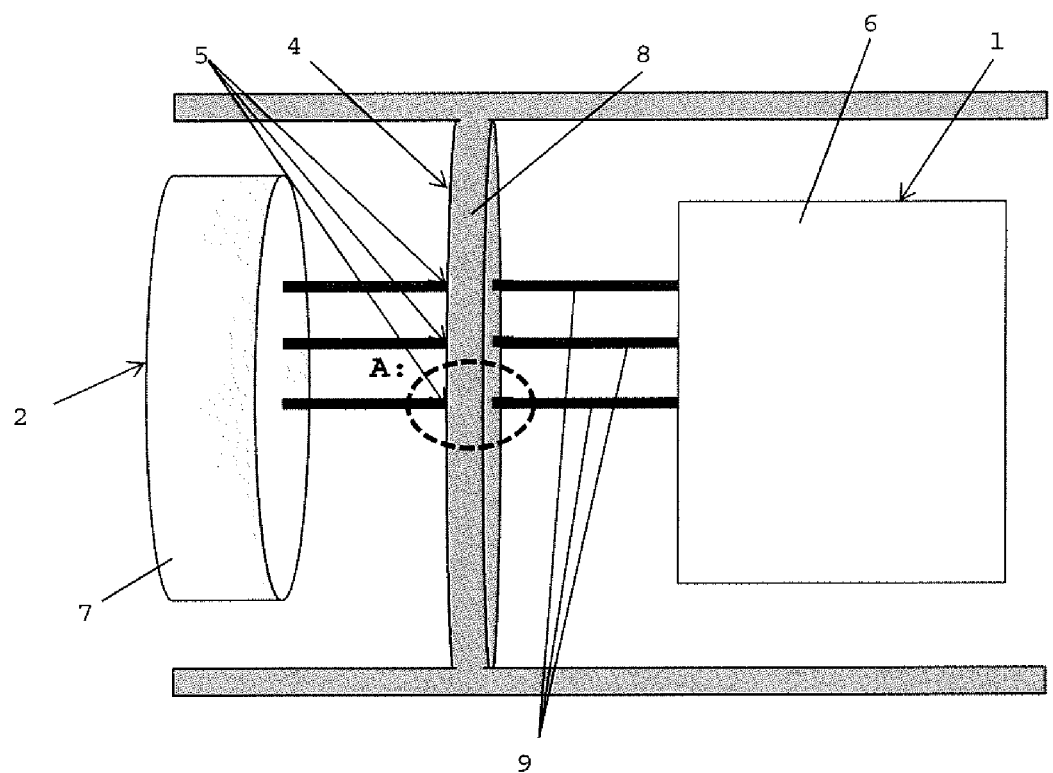
FIG. 1 is a schematic view of two components that are electrically connected to one another by means of a plurality of conductors, in the form of feedthrough contacts, according to the invention, the two components being separated from one another by a partition element.

The accompanying drawings are intended to convey a further understanding of the embodiments of the invention. These illustrate embodiments and, in conjunction with the description, are provided to explain principles and concepts of the invention. Other embodiments and many of the aforementioned advantages are apparent from the drawings. The elements of the drawings are not necessarily to scale with respect to one another.

Unless stated otherwise, identical, functionally identical and identically acting elements, features and components are in each case denoted by identical reference numerals in the figures in the drawings.

DESCRIPTION OF EMBODIMENTS

FIG. 1 is a greatly simplified view of two components 1, 2 that are electrically connected to one another by means of a plurality of conductors 9 in the form of feedthrough contacts, the two components 1, 2 being separated from one another by a partition element 4. The partition element 4, together with the first component 1 comprising the at least one conductor 9, forms a system according to the invention, in which the first component can electrically contact or be electrically connected to the second component 2 on the other side of the partition element 4 by means of the at least one conductor 9, the conductor being accommodated in a feedthrough 5 of the partition element 4 in a tight, in particular liquid-tight and preferably gas-tight, manner, as will be described in greater detail in the following.

The conductor 9 can be provided as a pin. This applies to all embodiments of the invention. The contacts or feedthrough contacts thus have to be fed through the partition element 4 so as to electrically connect the two components 1, 2 to one another.

The feedthrough contacts are fed through the partition element 4 in such a way that an electrically insulated and preferably tight, in particular liquid-tight and/or gas-tight, feedthrough 5 of the respective feedthrough contact through the partition element 4 is provided.

Figure 2:
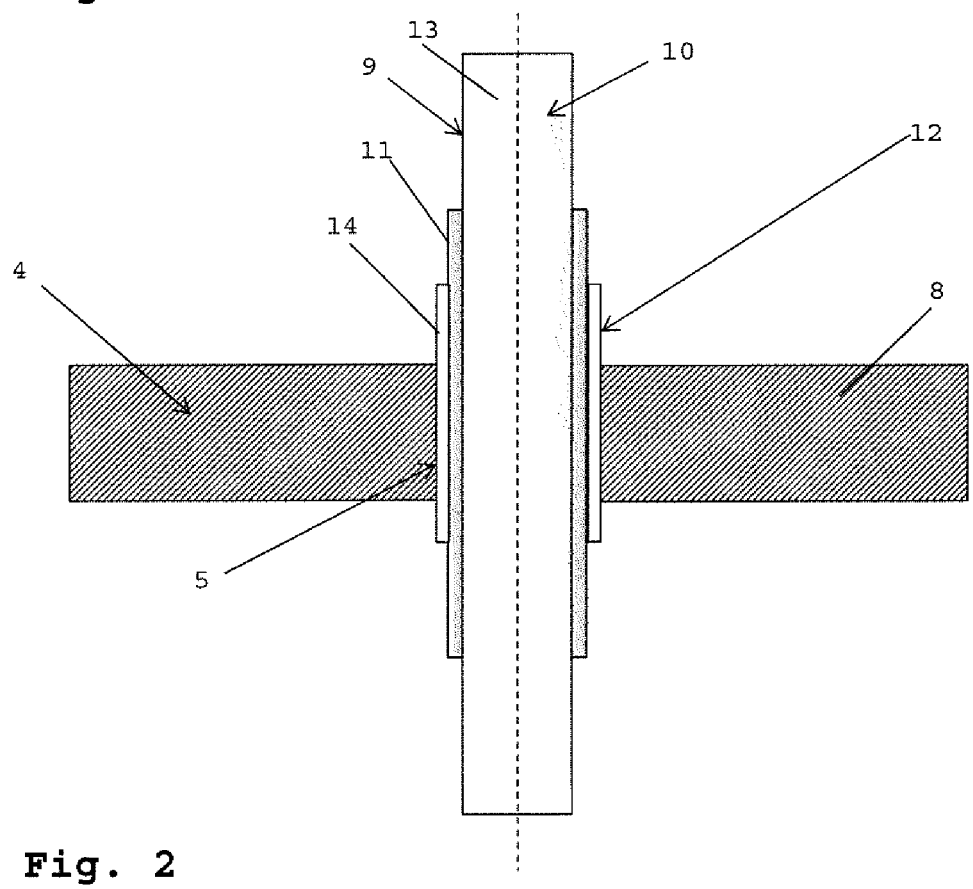
FIG. 2 is a detail A of a conductor, in the form of a feedthrough contact, and the feedthrough thereof through the partition element according to FIG. 1.

Such an electrically insulated and tight feedthrough 5, in particular liquid-tight and/or gas-tight feedthrough 5, of a respective feedthrough contact through the partition element 4 is described in greater detail in the following on the basis of FIG. 2. FIG. 2 is detail A, which is indicated in FIG. 1 by a dotted line.

In FIG. 1, an electronics assembly 6 and a stator winding 7 are shown in a greatly simplified and purely schematic manner as examples of the two components 1, 2 to be electrically connected, and are separated from one another by a housing wall 8 which serves as an example of a partition element 4. The housing wall can be made of metal, for example steel, aluminium or an aluminium alloy, and/or of plastics material, fibre-reinforced plastics material, etc., for example.

However, the invention is limited neither to an electronics assembly 6 and a stator winding 7 as examples of components 1, 2 to be electrically connected to one another by at least one feedthrough contact 3, nor to a housing wall 8 as an example of a partition element 4, or to a plurality of feedthrough contacts, for example in the form of phase contacts. Instead, any component can be provided which can be electrically connected to another component by means of at least one contact or feedthrough contact, the two components being separated from one another by a partition element through which the at least one contact or feedthrough contact is to be fed.

FIG. 2 is a purely schematic and greatly simplified detail A of one of the contacts or feedthrough contacts shown in FIG. 1, and of the feedthrough thereof through the partition element 4 according to FIG. 1. Detail A is shown in a sectional view in FIG. 2.

A conductor 9 of a component 1, in the form of a feedthrough-contact 3, is inserted through a feedthrough 5 in the partition element 4 from one side of the partition element 4 and is fed through the feedthrough 5 so as to electrically contact another component 2 on the other side of the partition element 4. The two components 1 and 2 are shown in FIG. 1. In the partition element 4 in the embodiment shown in FIG. 2, a cylindrical feedthrough, for example a through-hole, is provided as the feedthrough 5 for feeding through a corresponding conductor 9 having a circular cross-section. The invention is limited neither to a conductor 9, in the form of the feedthrough contact having a continuous circular cross-section, nor to a cylindrical feedthrough 5.

The conductor 9 to be fed through is made of drawn aluminium or aluminised copper, for example. Such a conductor 9 made of aluminised copper, in the form of the feedthrough contact, is shown in the embodiment in FIG. 2. In a conductor 9 made of aluminised copper, the conductor 9, in the form of a copper conductor 10, comprises a core made of copper or a copper alloy and is, on the outside thereof, provided with an additional aluminium coating 11 made of aluminium or an aluminium alloy, as is shown in the embodiment in FIG. 2. Aluminised copper is advantageous in that it exhibits particularly good conductivity and is therefore particularly well-suited where high conductivity is desirable. As a result of the aluminisation of the copper conductor, an oxide layer or anodised coating 14, which is described in the following, may subsequently be applied to the copper conductor or the aluminium coating 11 thereof, as shown in FIG. 2. The oxide layer or anodised coating 14 has an electrically insulating effect. Such (an) oxide layer(s) or anodised coating(s) 14 can be generated by means of anodic, electric oxidation, and produces an insulating layer or layers that will adhere to aluminium or the aluminium coating 11. In contrast to aluminium or the aluminium coating 11, copper itself cannot be anodised. Aluminium or the aluminium coating 11 therefore has to be provided on the outside of a conductor made of copper, since only aluminium can be anodised.

In the case of an aluminium conductor made of drawn aluminium or a drawn aluminium alloy, in contrast, an additional coating made of aluminium or an aluminium alloy, as is the case for the copper conductor, is not provided.

The invention, however, is limited neither to aluminium conductors nor to additionally aluminised copper conductors. It is also possible to provide any other metallic electrical conductor, which can preferably be provided with an oxide layer or anodised coating.

The aluminisation or galvanic aluminisation of the conductor 9 to be fed through the partition element 4, which is a copper conductor here, can also be provided, for example, only in a predetermined region of the conductor 9, for example a region of the conductor 9 to be kept free of oxide, for example so as to ensure the conductor 9 contacts the other component 2 in an oxide-free manner on the other side of the feedthrough 5 or feedthrough point in the partition element 4. The aluminisation or aluminium coating 11 of the conductor 9, which is a copper conductor here, can take place not only by means of galvanic aluminisation, but also, for example, by connecting, in particular form-fittingly connecting, the conductor 9 to an aluminium sleeve or tube. For this purpose, for example, a copper conductor is inserted into an aluminium tube and, for example, at least the aluminium tube is drawn until a form-fitting connection between the copper conductor and the aluminium tube is obtained. The aluminium tube in this case then forms the aluminium coating of the conductor 9, which is a copper conductor here, for example. The conductor is arranged coaxially in the aluminium tube.

Furthermore, the conductor 9, for example the aluminised copper conductor, together with the coating 11 thereof in the embodiment shown in FIG. 2, is provided with an additional coating 14. The additional coating 14 is provided on the outside of the conductor 9, and in the embodiment in FIG. 2 is provided on the outside of the first coating 11.

The additional coating 14 is located on the conductor 9 in what is subsequently the zone or the region 12 of the feedthrough 5 and is, as described above, formed as an oxide layer or anodised coating, for example made of aluminium or an aluminium alloy. The additional coating 14 is applied to the conductor 9, or the first coating 11 thereof, by anodisation, for example. Anodising is a generally known method for finishing aluminium or aluminium alloy surfaces. This is an anodic treatment since the material is electrochemically oxidised in a bath. The oxide layer or anodised coating, in the form of the coating 14, is a good insulator, which is characterised by mechanical scratch resistance and durability. The invention, however, is not limited to an oxide layer or anodised coating, in the form of the coating 14. It is possible to provide any other suitable electrically insulating and mechanically resistant coating.

The two coatings 11 and 14, however, are optional and may also be dispensed with and replaced with coatings having comparable properties. This applies to all embodiments of the invention.

In the production of the feedthrough 5, in particular the cylindrical feedthrough or through-hole, for the conductor 9 in the partition wall 4, a certain diameter of the feedthrough 5 is maintained. Suitable measures may be provided to maintain the diameter of the feedthrough 5. For this purpose, the material to be penetrated is provided with an undersized borehole or press fit in the following so as to accommodate and feed the conductor 9 through as a feedthrough contact.

The conductor 9, in the form of a through-contact, is cooled compared to the partition element 4 prior to joining. For cooling, a suitable agent, for example liquid nitrogen, may be used. The conductor 9, in the form of a feedthrough contact, is cooled such that the diameter thereof shrinks, and the shrinkage of the size thereof allows joining into the undersized feedthrough 9, which is the undersized through-hole here, in the partition element 4. During the subsequent adjustment of the temperature of the conductor 9 to the temperature of the partition element 4, the conductor 9, in the form of the feedthrough contact, is pressed into the through-hole of the partition element 4, and, due to the ductile properties of the conductor core 13 thereof, made of aluminium, an aluminium alloy or copper, for example, is able to adapt to the material of the partition element 4 to be penetrated, for example the housing wall 8 in the embodiment in FIGS. 1 and 2. The oxide layer or anodised coating, in the form of the additional coating 14, is a hard and insulating layer, provided it has not been compressed.

The form fit with the partition element 4, or the form-fitting connection between the conductor 9 and the partition element 4, achieved by means of the shrinkage process and the subsequent expansion process of the conductor 9, allows sufficient or suitable liquid tightness and in particular gas tightness of the feedthrough of the conductor 9 through the partition element 4 to be achieved.

Figure 3:
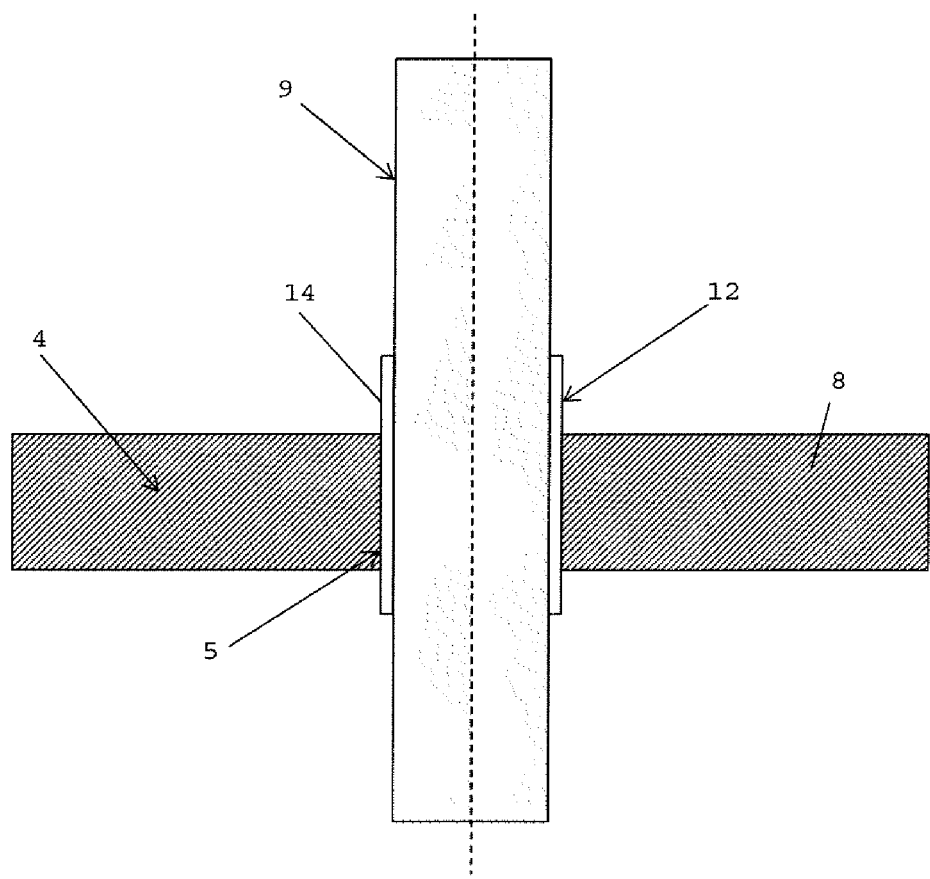
FIG. 3 is the detail A according to FIG. 2, the conductor, in the form of a feedthrough contact, being made of drawn aluminium.

FIG. 3 is the detail A according to FIG. 2; however the conductor, in the form of a feedthrough contact, is made of drawn aluminium.

The embodiment shown in FIG. 3 has the same construction and the same procedure as the embodiment shown in FIG. 2, and so reference is made in this regard to the comments provided in FIGS. 1 and 2 to avoid unnecessary repetition. The embodiment shown in FIG. 3 differs from the embodiment shown in FIG. 2 only in that the conductor 9 in FIG. 3 is an aluminium conductor made of aluminium or an aluminium alloy and is not additionally aluminised. In contrast to the embodiment in FIG. 2, the conductor 9 accordingly comprises on the outside thereof, at least in the region of the feedthrough 5 through the partition element 4, only the oxide layer or anodised coating as the additional coating 14.

Figure 4:
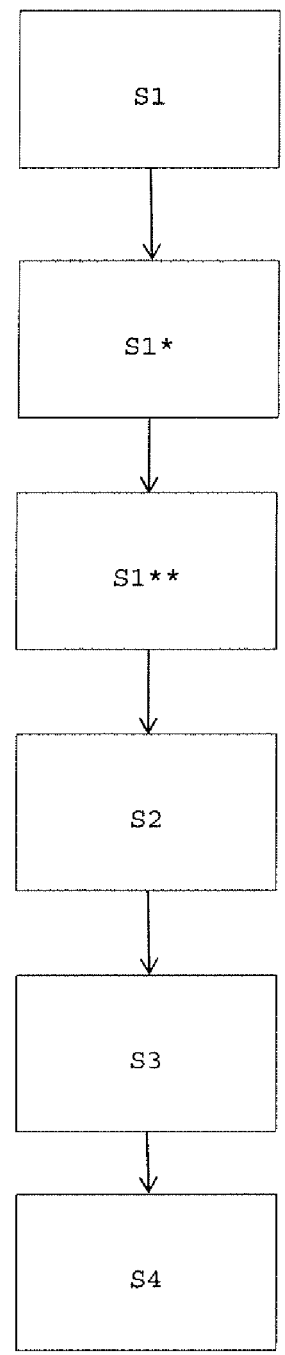
FIG. 4 is a flow chart for producing a feedthrough according to the invention of the contact through the partition element according to FIGS. 1, 2 and 3.

FIG. 4 shows an embodiment of a flow chart for producing a feedthrough according to the invention of a conductor, in the form of a feedthrough contact of a first component through a partition element for the electrical connection to a second component on the opposite side of the partition element, as was shown above by way of example with reference to FIGS. 1, 2 and 3.

In a first step S1, the first component comprising at least one conductor is provided, the conductor being made of an electrically conductive material, for example an aluminium conductor, or at least comprises a core made of an electrically conductive material, such as a copper conductor, as shown in FIG. 2.

In the case of a copper conductor, this is aluminised in an optional step S1* and provided with an additional coating made of aluminium or an aluminium alloy on the outside thereof, at least in the region of the feedthrough of the conductor through the partition element, so as to enable subsequent anodisation for electrical insulation. In the case of an aluminium conductor, for example made of drawn aluminium or an aluminium alloy, an additional aluminisation of the conductor by means of this coating can be dispensed with and instead an oxide layer or anodised coating can be applied directly in a next step S1**, at least in the region of the feedthrough of the aluminium conductor through the partition element.

In the next step S1, the conductor, which is the aluminium conductor here, or in the case of the copper conductor the aluminised region thereof, is provided with an additional oxide layer or anodised coating, in particular an oxide layer or anodised coating made of aluminium or an aluminium alloy. The conductor can be an aluminium conductor made of drawn aluminium or an aluminium alloy, for example, as shown in FIG. 3, or an aluminised copper conductor, as shown in FIG. 2**, or a copper conductor connected in a form-fitting manner to an aluminium sleeve or tube.

In a step S2, the partition element is provided with a feedthrough, for example a through-hole, the feedthrough being provided in an undersized dimension.

Thereupon, in a step S3, the conductor or at least the portion of the conductor to be fed through the partition element and the feedthrough thereof are cooled such that the diameter of the conductor shrinks to a suitable degree, so as to be able to be joined into the undersized feedthrough 5.

In a subsequent step S4, the temperature of the conductor is adjusted to the temperature, in particular the operating temperature, of the partition element, the conductor, in the form of a feedthrough contact, being pressed into the feedthrough of the partition element and, together with the oxide layer or anodised coating thereof, forming a tight, in particular liquid-tight and preferably a gas-tight, connection to the feedthrough at the operating temperature or in an operating temperature range of the partition element.

Although the present invention was described above in full on the basis of preferred embodiments, it is not limited to these, but may be modified in a variety of ways. In particular, the individual embodiments, as they were described with reference to FIGS. 1 to 4, can also be combined with one another, in particular individual features thereof.

LIST OF REFERENCE NUMERALS

1 component
2 component
4 partition element
5 feedthrough
6 electronics assembly
7 stator winding
8 housing wall
9 conductor
10 copper conductor
11 coating
12 region
13 conductor core
14 oxide layer or anodised coating

The invention claimed is:

1. A system comprising:
a partition element; and
a first component which is arranged on a first side of the partition element,
wherein the first component comprises at least one conductor, and the partition element comprises an associated feedthrough for inserting and feeding through the conductor and for electrically contacting the conductor on a second side of the partition element located opposite the first side, wherein the conductor forms a form-fitting connection to the feedthrough and is pressed into the feedthrough,
wherein the conductor, at least in the region of the feedthrough of the partition element, is provided with an oxide layer or anodised coating.

2. A system comprising:
a partition element; and
a first component which is arranged on a first side of the partition element,
wherein the first component comprises at least one conductor, and the partition element comprises an associated feedthrough for inserting and feeding through the conductor and for electrically contacting the conductor on a second side of the partition element located opposite the first side, wherein the conductor forms a form-fitting connection to the feedthrough and is pressed into the feedthrough,
wherein the feedthrough is a through-hole which forms a press fit with the inserted and fed-through conductor, a diameter of the conductor being previously shrunk by means of cooling for the insertion and feeding-through in the feedthrough.

3. The system according to claim 1,
wherein the conductor, at least in a region of the feedthrough of the partition element, is aluminised on an outside thereof and is preferably provided with a coating made of aluminium or an aluminium alloy or connected in a form-fitting manner to an aluminium sleeve or an aluminium tube.

4. The system according to claim 3, wherein
the oxide layer or anodised coating is applied to the outside of the conductor or, in the case of an aluminised conductor, is applied to the aluminised outside of the conductor with a coating made of aluminium or an aluminium alloy, an aluminium sleeve or an aluminium tube of the aluminised conductor.

5. The system according to claim 1,
wherein the conductor is made of an electrically conductive material or electrically conductive material combination.

6. The system according to claim 1,
wherein the partition element is made of metal, a metal alloy, plastics material and/or fibre-reinforced plastics material.

7. The system according to claim 1,
wherein the conductor is accommodated in the feedthrough of the partition element in a tight, in particular in a liquid-tight and/or gas-tight, manner.

8. The system according to claim 1,
wherein the conductor is constructed and arranged to electrically contact a second component on the second side of the partition element, the first component being an electrical winding, and the second component being an electronics assembly, or vice versa.

9. The system according to claim 5,
wherein the conductor is made of copper, a copper alloy, aluminium and/or an aluminium alloy.

* * * * *